United States Patent
Shah

(10) Patent No.: US 8,857,761 B2
(45) Date of Patent: Oct. 14, 2014

(54) VARIABLE GEOMETRY AIRCRAFT PYLON STRUCTURE AND RELATED OPERATION TECHNIQUES

(75) Inventor: Parthiv N. Shah, San Diego, CA (US)

(73) Assignee: ATA Engineering, Inc., San Diego, CA (US)

( * ) Notice: Subject to any disclaimer, the term of this patent is extended or adjusted under 35 U.S.C. 154(b) by 480 days.

(21) Appl. No.: 13/211,171

(22) Filed: Aug. 16, 2011

(65) Prior Publication Data

US 2012/0104161 A1    May 3, 2012

Related U.S. Application Data

(60) Provisional application No. 61/407,353, filed on Oct. 27, 2010.

(51) Int. Cl.
    *B64D 27/00* (2006.01)

(52) U.S. Cl.
    USPC .......................................................... 244/54

(58) Field of Classification Search
    USPC ...... 244/54, 58, 110 B, 113, 183, 198, 199.3;
    60/204, 226.1, 226.2, 263, 762
    See application file for complete search history.

(56) References Cited

U.S. PATENT DOCUMENTS

| | | | |
|---|---|---|---|
| 2,504,422 A | 4/1950 | Johnson et al. |
| 2,709,054 A | 5/1955 | Roth |
| 4,203,285 A | 5/1980 | Hanloser et al. |
| 4,382,569 A | 5/1983 | Boppe et al. |
| 4,917,332 A | 4/1990 | Patterson, Jr. |
| 5,100,085 A | 3/1992 | Rubbert |
| 5,102,068 A | 4/1992 | Gratzer |
| 5,150,859 A | 9/1992 | Ransick |
| 5,228,641 A | 7/1993 | Remlaoui |
| 5,259,187 A | 11/1993 | Dunbar et al. |
| 5,294,080 A | 3/1994 | Ross |
| 5,315,821 A | 5/1994 | Dunbar et al. |
| 5,467,941 A | 11/1995 | Chee |
| 5,592,813 A | 1/1997 | Webb |
| 5,702,071 A | 12/1997 | Kroll et al. |
| 5,735,485 A | 4/1998 | Ciprian et al. |

(Continued)

FOREIGN PATENT DOCUMENTS

WO    WO 2009/110943    9/2009

OTHER PUBLICATIONS

Steven X.S. Bauer, An Aerodynamic Assessment of Micro-Drag Generators (MDGs), American Institute of Astronautics and Aeronautics, 1998, pp. 1-11, US.

(Continued)

*Primary Examiner* — Valentina Xavier
(74) *Attorney, Agent, or Firm* — Ingrassia Fisher & Lorenz, P.C.

(57) ABSTRACT

An aircraft control structure can be utilized for purposes of drag management, noise control, or aircraft flight maneuvering. The control structure includes a high pressure engine nozzle, such as a bypass nozzle or a core nozzle of a turbofan engine. The nozzle exhausts a high pressure fluid stream, which can be swirled using a deployable swirl vane architecture. The control structure also includes a variable geometry pylon configured to be coupled between the nozzle and the aircraft. The variable geometry pylon has a moveable pylon section that can be deployed into a deflected state to maintain or alter a swirling fluid stream (when the swirl vane architecture is deployed) for drag management purposes, or to assist in the performance of aircraft flight maneuvers.

19 Claims, 11 Drawing Sheets

(56) References Cited

U.S. PATENT DOCUMENTS

| | | |
|---|---|---|
| 5,791,875 A | 8/1998 | Ngo |
| 5,794,432 A | 8/1998 | Dunbar et al. |
| 5,904,320 A | 5/1999 | Tindell |
| 5,934,612 A | 8/1999 | Gerhardt |
| 6,131,853 A | 10/2000 | Bauer et al. |
| 6,260,809 B1 | 7/2001 | Egolf et al. |
| 6,292,763 B1 | 9/2001 | Dunbar et al. |
| 6,474,604 B1 | 11/2002 | Carlow |
| 6,817,573 B2 | 11/2004 | Harrison et al. |
| 6,845,607 B2 | 1/2005 | Lair |
| 6,886,778 B2 | 5/2005 | McLean |
| 6,892,988 B2 | 5/2005 | Hugues |
| 6,948,910 B2 | 9/2005 | Polacsek |
| 7,104,251 B2 | 9/2006 | Kim |
| 7,111,448 B2 | 9/2006 | Anderson |
| 7,134,631 B2 | 11/2006 | Loth |
| 7,207,526 B2 | 4/2007 | McCarthy |
| 7,588,415 B2 | 9/2009 | Giaimo et al. |
| 2005/0184196 A1 | 8/2005 | Shmilovich et al. |
| 2005/0279081 A1 | 12/2005 | Lardellier |
| 2006/0022092 A1 | 2/2006 | Miller et al. |
| 2006/0266882 A1 | 11/2006 | Kummer et al. |
| 2007/0041823 A1 | 2/2007 | Miller |
| 2007/0170313 A1 | 7/2007 | Delaplace |
| 2008/0022651 A1 | 1/2008 | Papamoschou |
| 2010/0254803 A1 | 10/2010 | Papamoschou |

OTHER PUBLICATIONS

Antonio Filippone, Steep-Descent Maneuver of Transport Aircraft, Journal of Aircraft, Sep. 2007, pp. 1727-1739, vol. 44, No. 5.

Hiten Mulchandani, An Engine Air-Brake Integration Study, Submitted to the Department of Aeronautics and Astronautics in partial fulfillment of the requirements for the degree of Master of Science in Aeronautics and Astronautics at the Massachusetts Institute of Technology, Feb. 2011, 112 pages.

Parthiv N. Shah, Aeroacoustics of Swirling Exhaust Flows in High Bypass Ratio Turbofan Nozzles for Drag Management Applications, 17th AIAA/CEAS Aeroacustics Conference, Jun. 2011, pp. 1-15, Portland, Oregon, US.

P. Shah, et al., Drag Management in High Bypass Turbofan Nozzles for Quiet Approach Applications, Proceedings of ASME Turbo Expo 2011, Jun. 2011, 1-15, Vancouver, BC, CA.

VARIABLE GEOMETRY AIRCRAFT PYLON STRUCTURE AND RELATED OPERATION TECHNIQUES

CROSS-REFERENCE TO RELATED APPLICATION

This application claims the benefit of U.S. provisional patent application Ser. No. 61/407,353, filed Oct. 27, 2010 (the entire content of which is incorporated by reference here).

STATEMENT REGARDING FEDERALLY SPONSORED RESEARCH OR DEVELOPMENT

The United States government has a paid-up license in this invention and the right in limited circumstances to require the patent owner to license others on reasonable terms as provided by the terms of contract number NNX09CA33C awarded by the National Aeronautics and Space Administration (NASA).

TECHNICAL FIELD

Embodiments of the subject matter described herein relate generally to aircraft structures and subsystems. More particularly, embodiments of the subject matter relate to an aircraft engine pylon structure having a variable geometry for drag management and flight control applications.

BACKGROUND

Turbofan engines require structural pylon hardware for mounting to the aircraft. Mounting attachment points are typically on the aircraft wing or fuselage. A pylon assembly typically includes structural elements that link attachment points on the aircraft and engine casing, and pass through the outer fan or bypass flow. The presence of a pylon creates the need for an aerodynamic fairing cutting through a bypass flow stream, and limits the use of propulsive exhaust in swirling flows for drag management applications. Additionally, pylons limit the use of propulsive exhaust in directing the flow for aircraft control purposes.

BRIEF SUMMARY

An exemplary embodiment of an aircraft control structure is provided. The aircraft control structure includes a nozzle assembly configured to exhaust a swirling fluid stream, and a pylon configured to be coupled between the nozzle assembly and an aircraft support structure. The pylon has a moveable pylon section positioned proximate an exit end of the nozzle assembly such that when deployed into a deflected state the moveable pylon section maintains the swirling fluid stream.

An exemplary embodiment of an aircraft subsystem is also provided. The subsystem includes a first engine configured to exhaust a first high pressure fluid stream, and a first variable geometry deployable pylon configured to be coupled between the first engine and an aircraft. The first variable geometry deployable pylon includes a first moveable pylon section positioned proximate an exit end of the first engine to influence a primary component of thrust of the first high pressure fluid stream. The subsystem also includes a control system to actuate the first moveable pylon section into a deflected state to redirect the first high pressure fluid stream and alter its primary component of thrust in accordance with a flight maneuver command for the aircraft.

Another embodiment of an aircraft subsystem is also provided. The subsystem includes a first nozzle and a first swirl vane assembly configured to exhaust a first swirling fluid stream, and a first variable geometry deployable pylon configured to be coupled between the first nozzle and an aircraft. The first variable geometry deployable pylon has a first moveable pylon section positioned proximate an exit end of the first nozzle such that when deployed into a deflected state the first moveable pylon section influences the first swirling fluid stream. The subsystem also includes a second nozzle and a second swirl vane assembly configured to exhaust a second swirling fluid stream, and a second variable geometry deployable pylon configured to be coupled between the second nozzle and the aircraft. The second variable geometry deployable pylon has a second moveable pylon section positioned proximate an exit end of the second nozzle such that when deployed into a deflected state the second moveable pylon section influences the second swirling fluid stream. The subsystem also includes a control system to regulate deployment of the first swirl vane assembly, deployment of the second swirl vane assembly, and deflected positions of the first moveable pylon section and the second moveable pylon section in accordance with a drag management command for the aircraft.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
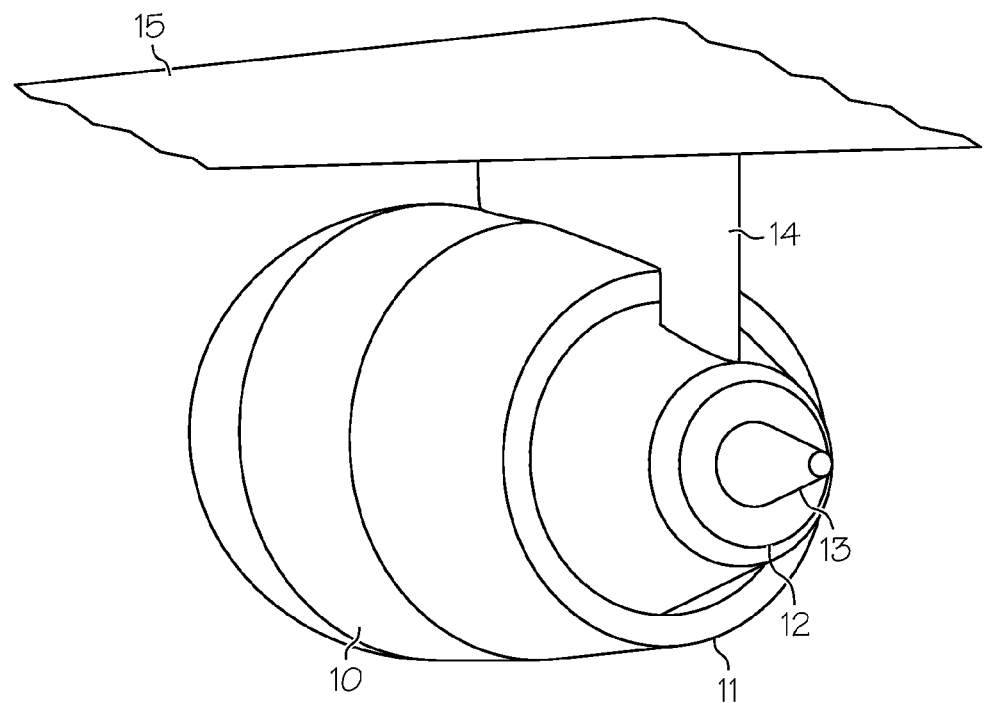
FIG. 1 is a perspective view of a typical turbofan engine installation under the wing of an aircraft.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

In addition, certain terminology may also be used in the following description for the purpose of reference only, and thus are not intended to be limiting. For example, terms such as "upper", "lower", "above", and "below" may refer to directions in the drawings to which reference is made. Terms such as "front", "back", "rear", "side", "outboard", and "inboard" may be used to describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

Various exemplary embodiments presented here relate to a deployable modification to a turbofan propulsion engine pylon structure to be used as part of an aircraft drag management system and/or an aircraft flight control system. The technology described here enables an aircraft structural pylon to assist the bypass stream of a turbofan engine to be used in aircraft drag management and/or control applications. One specific application of the variable geometry in the pylon structure is to sustain a swirling outflow from the turbofan's bypass fluid stream for aircraft drag management or aircraft control purposes. Another specific application of the variable geometry in the pylon structure is to redirect a portion of the fan stream for aircraft control purposes.

The techniques and technology described here are based on locally redirecting a stream of air out of a nozzle of a turbofan engine, such as the bypass nozzle. The stream has been pumped to a higher pressure than the ambient air and is therefore used in conventional operation to produce thrust. The structure described here allows: (1) the redirection of air from the high pressure stream in conjunction with a set of swirl vanes for aircraft drag management or aircraft control, as discussed in PCT patent application number WO 2009/110943 A9 (the relevant content of which is incorporated by reference herein); or (2) the redirection of air to alter the primary component of thrust from the high pressure air stream to be used to necessitate an aircraft control maneuver.

Figure 2:
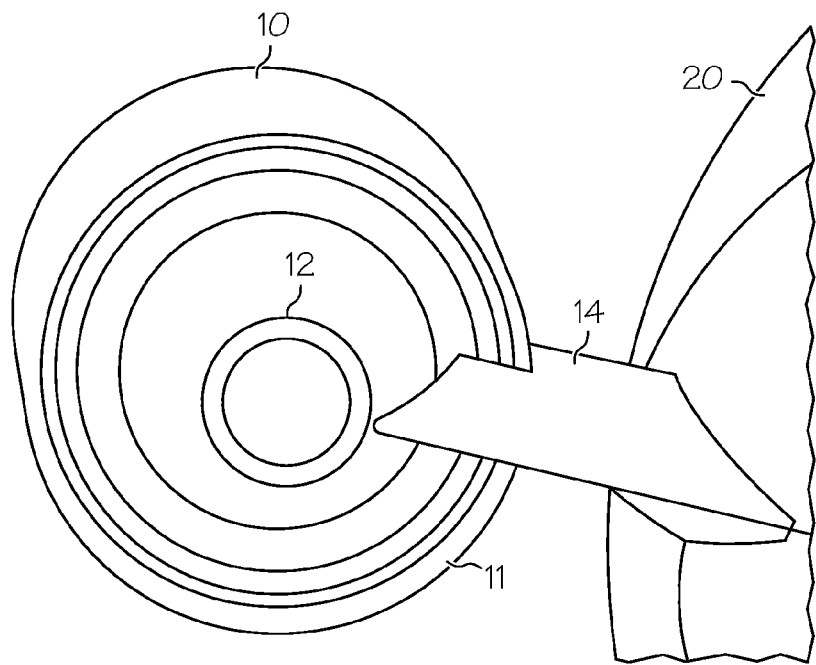
FIG. 2 is a perspective view of a typical turbofan engine installation on the fuselage of an aircraft.
Figure 3:
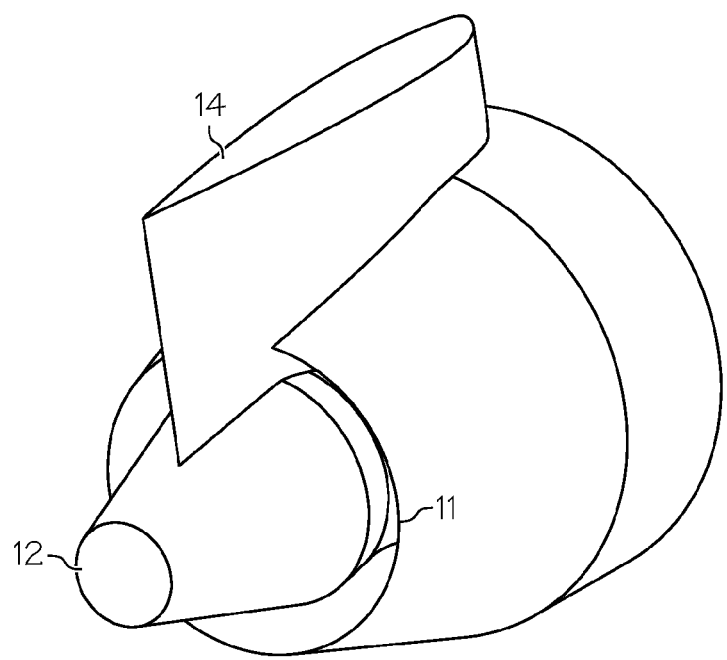
FIG. 3 is a perspective view of a two-stream nozzle geometry typical of a high-bypass ratio turbofan engine shown with a conventional pylon bifurcating the bypass stream.

FIG. 1 is a perspective view of a typical turbofan engine installation under the wing of an aircraft, and FIG. 2 is a perspective view of a typical turbofan engine installation on the fuselage of an aircraft. In either application, a turbofan engine 10 handles at least two streams of fluid which are pumped through a nozzle assembly. The outer pumped stream is referred to as the bypass stream and exhausts from a bypass nozzle 11. The inner stream is referred to as the core stream and exhausts from a core nozzle 12. The ratio of fluid mass exhausting the bypass stream to the fluid mass flow exhausting the core stream is referred to as the bypass ratio. The core stream may or may not include a centerbody 13, sometimes referred to as a plug, located downstream of the trailing edge of the core nozzle 12. FIG. 3 presents the geometry without an external plug, but with the aerodynamic surfaces of a conventional pylon 14. Mounting of the turbofan engine 10 to an aircraft is achieved via a structure such as a pylon 14 which includes the necessary structural load transferring hardware in addition to any aerodynamic fairing surfaces used to smoothly direct fluid from the ambient atmosphere or either or both of the turbofan engine streams. Typical pylon installations join the turbofan engine 10 to a wing structure 15 (FIG. 1) or a fuselage structure 20 (FIG. 2).

As described in more detail below, the subject matter presented here relates to a variable geometry aircraft pylon structure that includes a deployable trailing portion of the pylon. The deployable variable geometry aft pylon structure is wetted by fluid exhausting from the bypass nozzle. The variable geometry pylon structure is deployed into a deflected state via mechanical means in order to assist in drag management or the redirection of air to alter the primary component of thrust from the high pressure air stream to be used to necessitate an aircraft control maneuver. In this regard, the combination of the variable geometry deployable pylon and an engine nozzle may be considered to be a control structure or control subsystem of the aircraft. A fence-like structure may also be used in conjunction with the deployable variable geometry aft pylon structure in order to minimize the leakage of flow between the high pressure stream and the ambient air in applications that improve the drag management or flow control capability or reduce noise generated by the system. In certain embodiments, the variable geometry pylon structure is used in conjunction with a set of swirl vanes for use in drag management or aircraft control applications.

Figure 4:
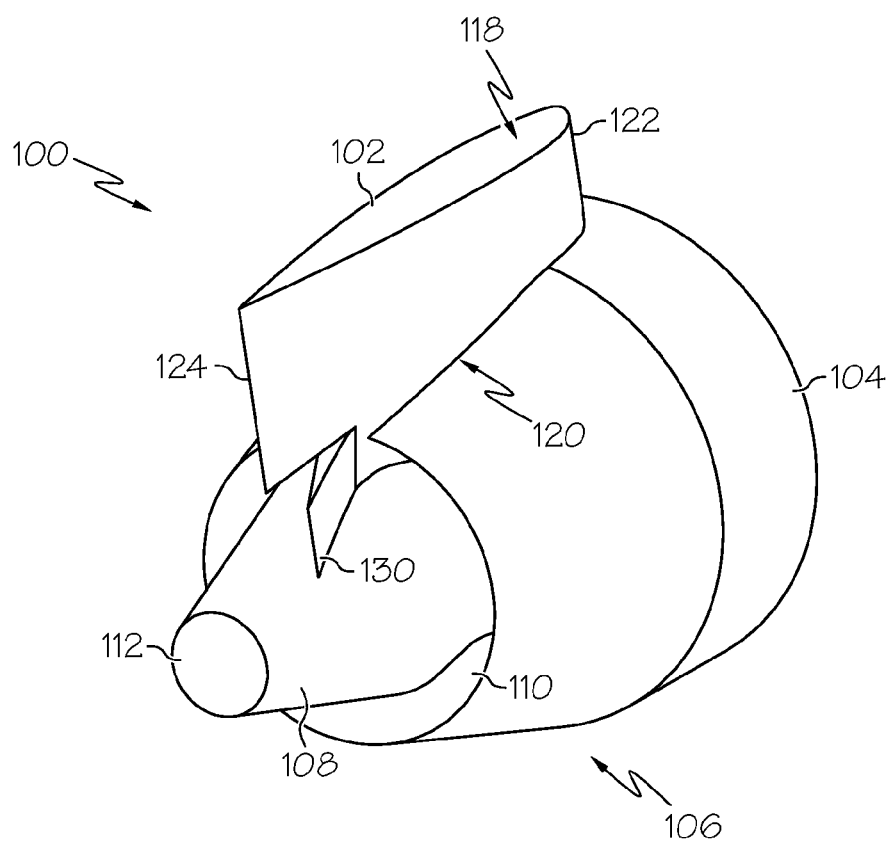
FIG. 4 is a perspective view of an exemplary embodiment of an aircraft engine assembly having a variable geometry pylon.

FIG. 4 is a perspective view of an exemplary embodiment of an engine assembly 100 having a variable geometry pylon 102. The engine assembly 100 may be deployed as a wing-mounted unit (similar to the configuration shown in FIG. 1), as a fuselage-mounted unit (similar to the configuration shown in FIG. 2), or in any other aircraft-mounted unit. For ease of illustration and clarity, the corresponding mounting structure of the host aircraft is not depicted in FIG. 4. As is well understood, the engine assembly 100 includes a nacelle 104 which may be generally tubular in shape with a tapered exit end 106. The engine assembly 100 also includes a nozzle structure 108 positioned inside the nacelle 104 and configured to define a bypass nozzle 110 and a core nozzle 112. The structure that forms the bypass nozzle 110 and/or the structure that forms the core nozzle 112 may be considered to be a nozzle assembly for the aircraft. For the illustrated example, the bypass nozzle 110 is defined between the nacelle 104 and an outer surface of the nozzle structure 108, and the core nozzle 112 is defined by structure located inside the nozzle structure 108. Although hidden from view in FIG. 4, the engine assembly 100 may include deployable swirl vanes positioned in the bypass nozzle 110 upstream from the exit end 106. The swirl vanes are described in more detail below with reference to FIGS. 5-8.

The pylon 102 has an aircraft mounting end 118, an engine mounting end 120 opposite the aircraft mounting end 118, a leading (fore) edge 122, and a trailing (aft) edge 124. The aircraft mounting end 118 is configured to be coupled to the wing, fuselage, or other support structure of the host aircraft. The engine mounting end 120 is configured to be coupled to the nacelle 104 and/or to other structure (such as the engine casing located inside of the nacelle 104) for mechanically attaching the engine assembly 100 to the host aircraft. As shown in FIG. 4, the pylon 102 may have a longitudinal cross sectional shape that resembles an airfoil. Accordingly, the pylon 102 is tapered at its trailing edge 124.

In certain embodiments, the lowermost section of the pylon 102 extends through a portion of the nacelle 104 for coupling to engine structures (not shown). Consequently, a portion of the pylon 102 may reside within the bypass nozzle 110. The portion of the pylon 102 inside the bypass nozzle 110 can impact the characteristics of the bypass flow, as is well understood.

The exemplary embodiment depicted in FIG. 4 includes a moveable pylon section 130 (FIG. 4 shows the moveable pylon section 130 in a deployed position). The moveable pylon section 130 is positioned proximate the exit end 106 of the nozzle assembly, and it may be moveably coupled at or near the trailing end of the pylon 102. When the moveable pylon section 130 is in its non-deployed state, the pylon 102 (including the moveable pylon section 130) resembles the pylon 14 shown in FIG. 3. In other words, when the moveable pylon section 130 is not deployed, its shape and contour blends with the general shape and contour of the remaining section of the pylon 102. Ideally, when not deployed, the outer surface of the moveable pylon section 130 is continuous with the outer surface of the remainder of the pylon 102 (other than a slight gap that defines the junction between the articulating section). This particular embodiment utilizes a hinged moveable pylon section 130 that pivots about a hinge axis 132 (see FIG. 5, which is a schematic side view of the aircraft engine assembly 100). The hinge axis 132 is located at a position that is downstream of the end of the nacelle 104 and upstream of the end of the nozzle structure 108. Alternate embodiments could employ any structure, material, device, or composition configured to be deployed from a surface of the pylon 102 and/or configured as a deployable section of the pylon 102. For example, a shape memory alloy or any suitable morphing structure could be utilized in a way that minimizes or eliminates gaps, seams, and hinges. As another example, a plurality of articulating, folding, or extendable segments could be arranged such that in a non-deployed state they form a smooth outer surface for the pylon 102 and such that in a deployed state they cooperate to form a protruding pylon section equivalent in function to the moveable pylon section 130.

Figure 5:
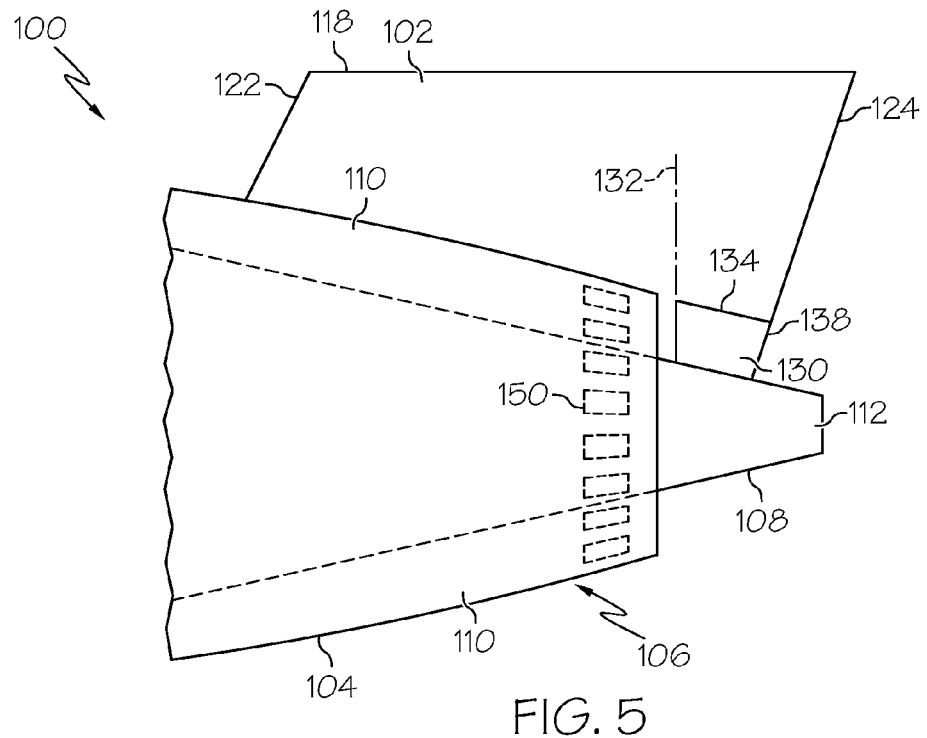
FIG. 5 is a schematic side view of the aircraft engine assembly shown in FIG. 4.

As shown in FIG. 5, the upper edge 134 and height of the moveable pylon section 130 may be configured to follow the overall contour and shape of the nacelle 104. For example, the upper edge 134 can be tapered to follow the shape of the nacelle 104 and/or the nozzle structure 108 to reduce the amount of undesired flow leakage that might otherwise be introduced by any prominent discontinuities.

The embodiment shown in FIG. 4 includes a "cutout" in the pylon 102 that serves as the moveable pylon section 130. In such an embodiment, the trailing edge 124 of the pylon 102 is aligned with the trailing edge 138 of the moveable pylon section 130 when the moveable pylon section 130 is in its non-deployed state (see FIG. 5). In the alternate embodiment shown in FIG. 6, however, a moveable pylon section 140 is formed such that it includes the entire trailing edge 124 of the pylon 102. In other words, the moveable pylon section 140 completely spans the trailing end of the pylon 102, extending between the aircraft mounting end 118 and the engine mounting end 120 of the pylon 102. Although the following description focuses on the embodiment shown in FIG. 4 and FIG. 5, most if not all of the description also applies to the embodiment shown in FIG. 6.

For simplicity, the shape of the moveable pylon section 130 (when viewed from a side elevation perspective) resembles a quadrilateral. In practice, however, the profile of the moveable pylon section 130 could be shaped as any polygon, or it could include one or more curved sections. For example, the moveable pylon section 130 could have a semicircular profile, a partially oval profile, or the like.

The upper edge of the moveable pylon section 130 and the corresponding lower edge of the pylon 102 are preferably configured to minimize the gap defined between them when the moveable pylon section 130 is in its non-deployed state. Moreover, the lower edge of the moveable pylon section 130 may be shaped in accordance with the outer surface of the nozzle structure 108 to accommodate the pivoting motion of a rigid moveable pylon section 130. For the illustrated embodiment, where the outer surface of the nozzle structure 108 has a conical shape, some amount of separation will occur between the moveable pylon section 130 and the nozzle structure 108 when the moveable pylon section 130 is deployed. If it is desirable to minimize the separation gap at the lower edge of the moveable pylon section 130, then the outer surface of the nozzle structure 108 and/or the lower edge of the moveable pylon section 130 can be designed accordingly. For example, it may be desirable to introduce a flat outer surface section of the nozzle structure 108 that contemplates the range of motion of the moveable pylon section 130 and maintains a tolerable separation gap between the flat outer surface section and the lower edge of the moveable pylon section 130.

FIG. 4 shows the moveable pylon section 130 deployed in the starboard direction. Depending upon the embodiment and desired application, movement of the moveable pylon section 130 may be limited to the starboard direction, limited to the port direction, or unlimited (i.e., the moveable pylon section 130 can pivot in both directions). In addition, the range of motion of the moveable pylon section 130 could be limited in either or both directions to ensure that the moveable pylon section 130 does not over-pivot into a position that compromises the performance of the engine assembly 100 and/or that degrades that desired benefits of deploying the moveable pylon section 130. In certain embodiments, for example, it may be desirable to limit the range of rotation of the moveable pylon section 130 to about thirty degrees relative to the major longitudinal axis of the pylon 102.

In yet other embodiments, the engine assembly 100 includes at least two moveable pylon sections 130 capable of concurrent deployment in different directions. For example, a single pylon 102 could include two distinct moveable pylon sections 130, where one of the two moveable pylon sections 130 pivots in the port direction while the other moveable pylon section 130 pivots in the starboard direction, independently or in concert. Such an arrangement may be desirable in certain situations for purposes of aircraft flight control, drag management, or the like.

Figure 7:
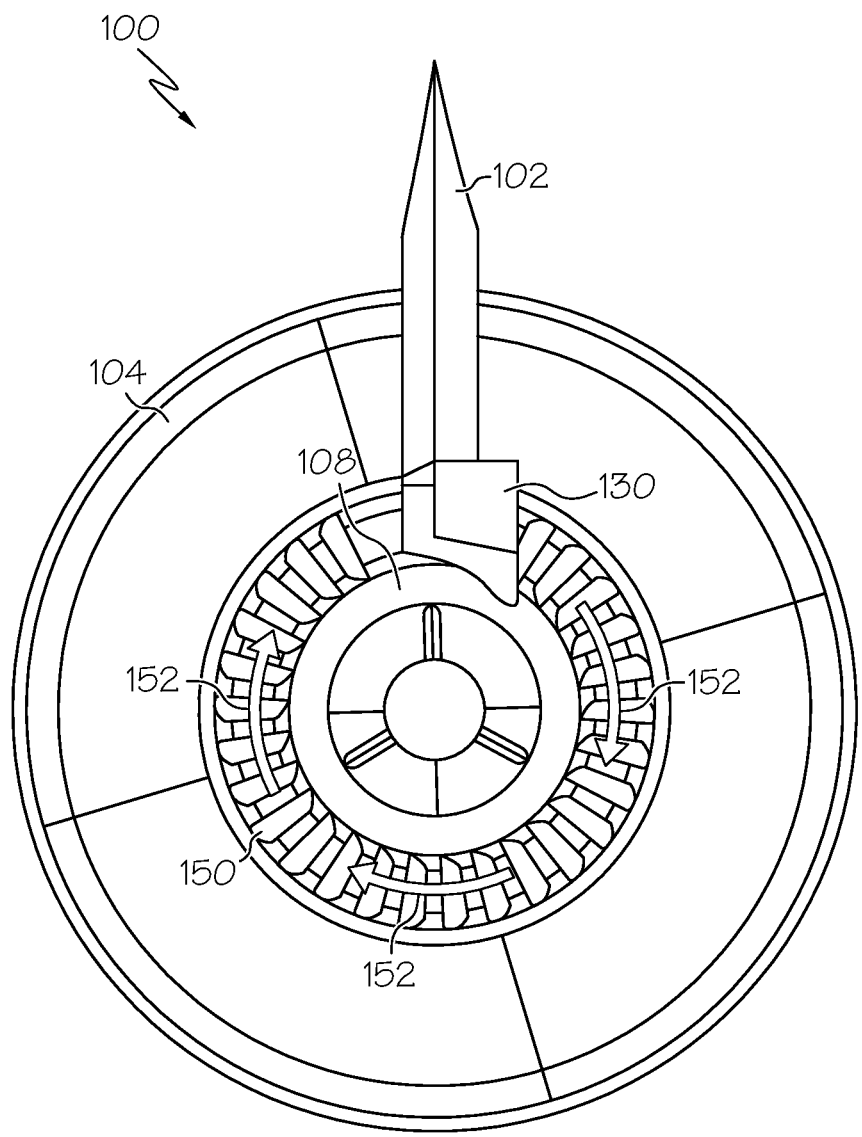
FIG. 7 is an end view (aft looking forward) of an exemplary embodiment of an aircraft engine assembly with a variable geometry pylon in an offset position.

As mentioned above, certain implementations of the engine assembly 100 include swirl vanes positioned inside the bypass nozzle 110 to produce a swirling fluid stream exiting the bypass nozzle 110. In this regard, a nozzle assembly can be suitably configured and controlled to exhaust a swirling fluid stream. The swirl vanes 150 are schematically depicted in FIG. 5. The swirl vanes 150 are also depicted in FIG. 7, which is an end view (aft looking forward) of the engine assembly 100. As best shown in FIG. 7, the swirl vanes 150 are arranged in an annular configuration around the outer surface of the nozzle structure 108. Each of the swirl vanes 150 has an inner edge that resides at or near the nozzle structure 108, and an outer edge that resides at or near the nacelle 104. To promote a swirling flow of the bypass stream, the swirl vanes 150 are tilted, pitched, or cambered relative to the fore-aft (longitudinal) axis of the engine assembly 100. In the exemplary embodiment shown in FIG. 7, the swirl vanes 150 are pitched in a direction that creates a clockwise swirl (relative to the perspective of FIG. 7), as represented by the arrows 152 in FIG. 7. It should be appreciated that the number of swirl vanes 150, the shape of each of the swirl vanes 150 (which need not be identical), the size of each of the swirl vanes 150, the separation between adjacent swirl vanes 150 (which need not be constant), the pitch of each of the swirl vanes 150 (which need not be the same), and/or other characteristics and parameters associated with the swirl vanes 150 may vary from one embodiment to another. Moreover, any number of these and possibly other characteristics of the swirl vanes 150 could be variable, adjustable, and/or controllable in certain embodiments. Furthermore, the configuration and arrangement of the swirl vanes 150 can be influenced by or dictated by the configuration and location of the pylon 102 and the moveable pylon section 130. For example, the spacing between adjacent swirl vanes 150, the pitch of the swirl vanes 150, and/or the shape of the swirl vanes 150 may be a function of their circumferential distance from the pylon 102.

Figure 8:
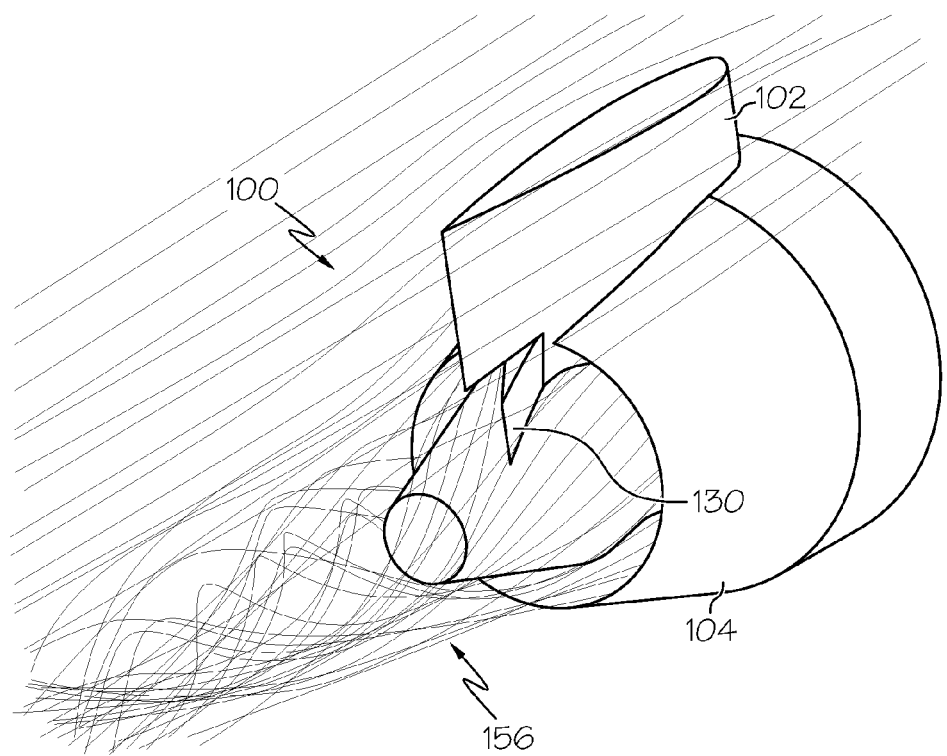
FIG. 8 is a diagram that illustrates a swirling outflow in the presence of a deployed moveable pylon section.

An exemplary swirling outflow is schematically illustrated in FIG. 8. The moveable pylon section 130 of the engine assembly 100 has been deployed to sustain the swirling outflow 156 produced by the swirl vanes 150. Notably, the moveable pylon section 130 has been activated into its deflected state to sustain and maintain a coherent swirling outflow 156 in the presence of the pylon 102 and to reduce/minimize disturbances associated with asymmetries in the geometry of the engine assembly 100. Notably, the major surface of the moveable pylon section 130 is approximately aligned with the swirl vanes 150 located proximate to the moveable pylon section 130. In other words, the pitch of the moveable pylon section 130 approximates the pitch of the swirl vanes 150 that are immediately adjacent to the moveable pylon section 130. This configuration is important to ensure that the swirling outflow 156 is maintained rather than interfered with. In contrast to that depicted in FIG. 7 and FIG. 8, a traditional pylon (or the pylon 102 with the moveable pylon section 130 in its non-deployed position) would interfere with the swirling flow created by the swirl vanes 150 and measurably degrade the swirling effect. Indeed, the presence of a conventional pylon in or near the bypass nozzle 110 (see FIG. 4) could significantly reduce or eliminate the benefits that would otherwise be derived from the swirl vanes 150. Accordingly, if increased drag is the objective, then the moveable pylon section 130 should not be positioned such that it opposes the direction of the swirling outflow 156.

In certain embodiments, the deployment and/or pitch of the swirl vanes 150 (individually or collectively) can be adjusted and controlled by a suitably configured onboard control system for purposes of drag management, noise reduction, aircraft flight control, or the like. Moreover, the deployment and/or pitch of the moveable pylon section 130 can also be adjusted and controlled in a stepwise or continuous manner to facilitate drag management, noise reduction, and/or aircraft flight control. In such an embodiment, deployment and actuation of the moveable pylon section 130 and the swirl vanes 150 may be performed in concert with one another, or independently. In this regard, the host aircraft could implement a common control system and actuation mechanisms to control the deployment and movement of the moveable pylon section 130 and/or the swirl vanes 150.

The moveable pylon section 130 may also be utilized to influence a component of thrust of the high pressure fluid stream exiting the nozzle assembly. For example, the direction and amount of deflection of the moveable pylon section 130 can be controlled to redirect the corresponding high pressure fluid stream and, in turn, alter its primary component of thrust. In practice, the actuation of the moveable pylon section 130 in this manner can be controlled in response to a flight maneuver command for the aircraft, e.g., a flight control command from the flight deck. This aspect is described in more detail below with reference to FIG. 13.

Figure 6:
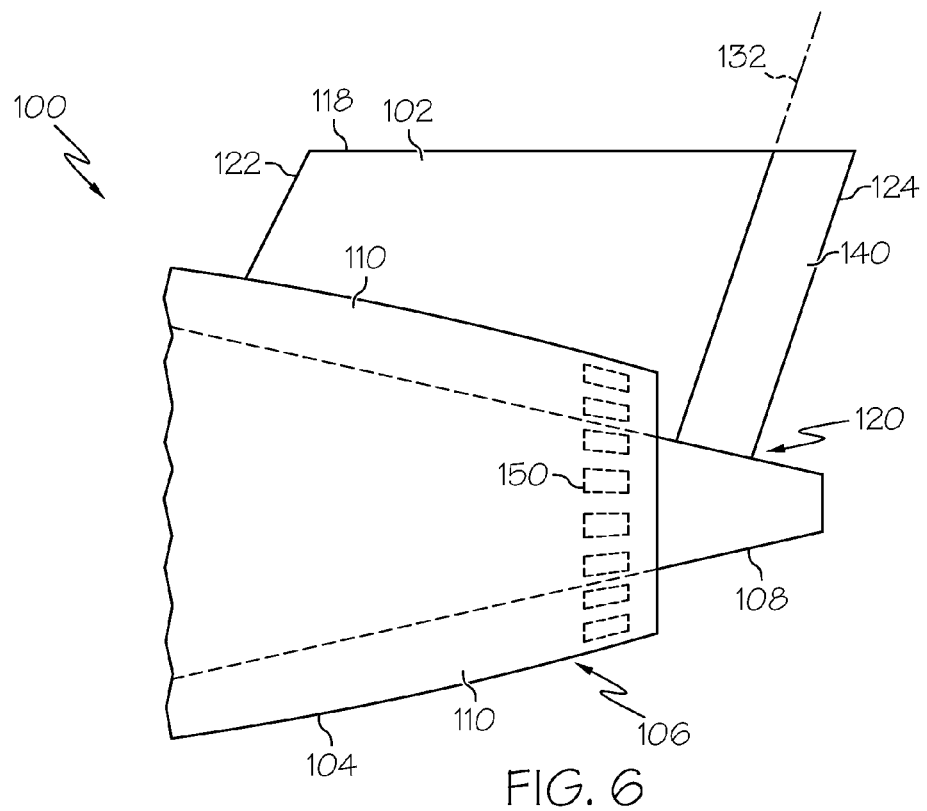
FIG. 6 is a schematic side view of the aircraft engine assembly shown in FIG. 4, with an alternate embodiment of a variable geometry pylon.

FIGS. 4, 5, 7, and 8 depict one exemplary embodiment of a pylon 102 having a deployable and moveable pylon section 130, and FIG. 6 shows an alternate embodiment that employs a moveable pylon section 140 that spans the entire trailing edge of the pylon 102. It should be appreciated that in alternate embodiments more than one deployable segment could be utilized along the trailing edge of a pylon if so desired. Moreover, the deployable pylon section need not always terminate at and include the trailing edge of the pylon. Instead, a pylon could include one or more moveable sections that deploy from a midsection of the pylon, such that the trailing edge of the pylon remains stationary and intact (this type of moveable pylon midsection can be visualized as a door that hinges outward from the "wall" defined by the aft portion of the pylon).

Figure 9A:
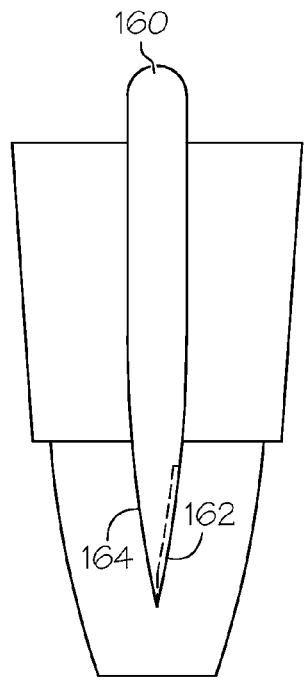
FIG. 9 is a schematic top view of a pylon having a deployable panel.
Figure 9B:
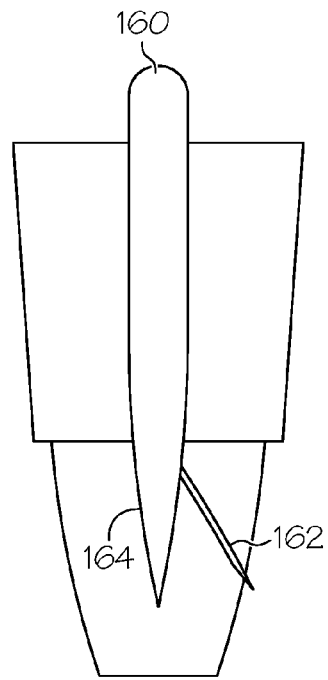

In an alternate embodiment, the moveable pylon section is realized as a panel that extends from the body of the pylon. In this regard, FIG. 9 is a schematic top view of an exemplary embodiment of a pylon 160 having a deployable panel 162. The left side of FIG. 9 shows the panel 162 in its stowed position, and the right side of FIG. 9 shows the panel 162 in a deployed position. In the stowed position the panel 162 is flush and continuous with the remaining surface of the pylon 160. In contrast to the embodiment described above with reference to FIGS. 4-8, the panel 162 extends from an aft section 164 of the pylon, and the aft section 164 remains stationary and in alignment with the major longitudinal axis of the pylon 160. Even though the entire aft section of the pylon 160 does not pivot as described above in connection with FIGS. 4-8, the extended panel 162 is still effective in maintaining the swirling outflow created by the swirl vanes (not shown in FIG. 9). It should be appreciated that the panel 162 may have a height that corresponds to the edge of the nacelle of the engine assembly (as depicted in FIG. 5 for the other embodiment), or it may span the entire trailing edge of the pylon (as depicted in FIG. 6 for the other embodiment).

Although FIG. 9 shows an exemplary implementation that uses only one deployable panel 162, an alternate embodiment could employ two or more deployable panels 162 if so desired. Moreover, the above description of various shapes, sizes, and arrangements of moveable pylon sections also apply to an embodiment that employs one or more deployable panels 162. For example, the shape, size, and number of deployable panels 162 may vary from one embodiment to another.

Figure 10:
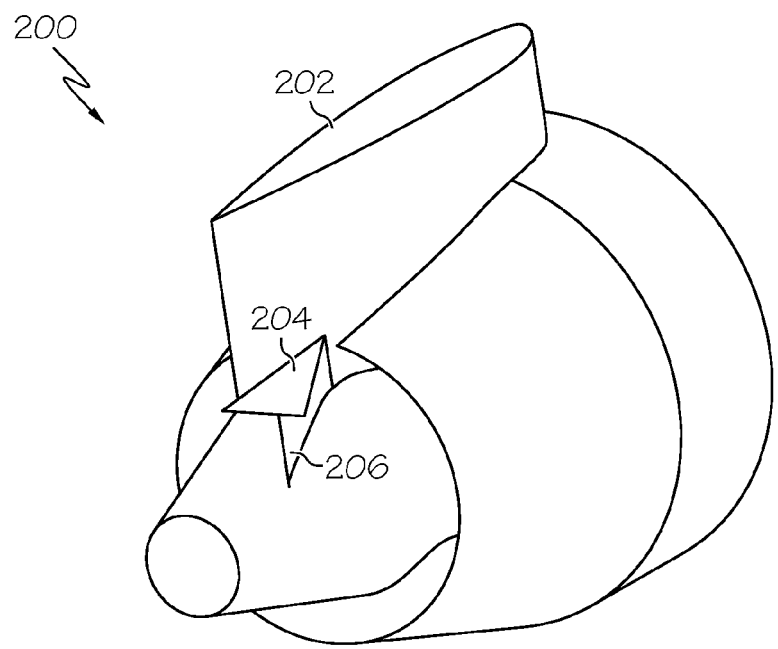
FIG. 10 is a perspective view of an exemplary embodiment of an aircraft engine assembly having a variable geometry pylon with a fence structure.
Figure 11:
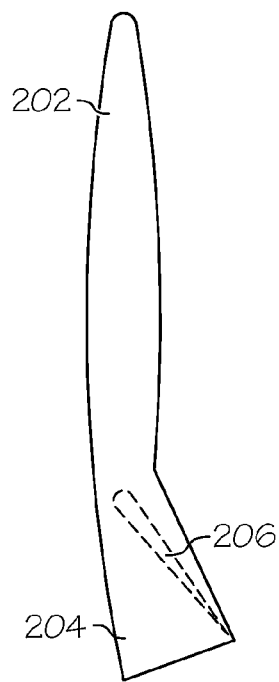
FIG. 11 is a top view of the pylon shown in FIG. 10.

FIG. 10 is a perspective view of another exemplary embodiment of an aircraft engine assembly 200 having a variable geometry pylon 202, a fence structure 204, and a moveable pylon section 206 that cooperates with the fence structure 204. FIG. 11 is a top view of the pylon 202. Many of the features and structures of the engine assembly 200 are similar or identical to those described above for the engine assembly 100. For the sake of brevity and clarity, common and shared features, elements, and functionality will not be redundantly described here in the context of the engine assembly 200.

The fence structure 204 is positioned overlying the moveable pylon section 206. For this particular embodiment, the fence structure 204 is coupled to or is otherwise integrated with the stationary portion of the pylon 202. Thus, the fence structure 204 is fixed and stationary relative to the primary section of the pylon 202. The fence structure 204 is positioned to allow the moveable pylon section 206 to swivel underneath the fence structure 204, as schematically depicted in FIG. 11. Referring to FIG. 5, the major surface of the fence structure 204 may be configured in accordance with the flow contour of the tapered exit end 106 of the nacelle 104. In other words, the fence structure 204 is shaped, sized, and positioned such that it is parallel to the natural fluid flow.

Figure 12:
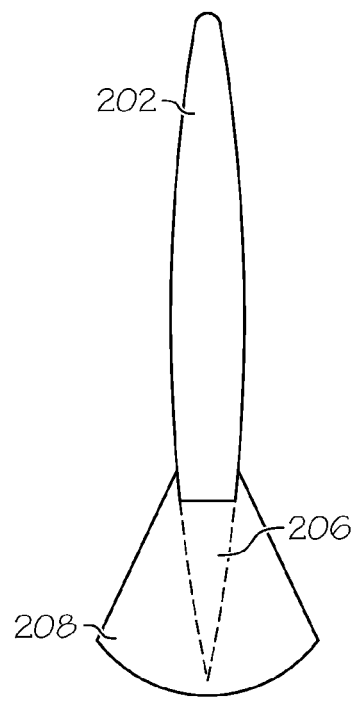
FIG. 12 is a top view of an alternate embodiment of the pylon shown in FIG. 10.

Referring to FIG. 11, the fence structure 204 is preferably shaped and sized such that it covers the moveable pylon section 206 throughout its range of movement. Accordingly, when the moveable pylon section 206 is deployed, the fence structure 204 provides a barrier between the flow above and below the gap formed at the discontinuous junction that would otherwise be created between the pylon 202 and the moveable pylon section 206 (i.e., the fence structure 204 serves as a "roof" element). The embodiment shown in FIG. 11 assumes that the moveable pylon section 206 only travels in the starboard direction. Accordingly, the fence structure 204 only extends in the starboard direction. Alternatively, a fence structure 208 could also extend in the port direction (symmetrically or otherwise), as depicted in FIG. 12. A double-sided fence structure 208 could be employed whether or not the moveable pylon section 206 pivots in one direction or both directions. The fence structure 204 is suitably configured to minimize undesired leakage of flow through the edge discontinuity that would otherwise be caused between the pylon 202 and the moveable pylon section 206, thus reducing the likelihood of the generation of side-edge related vortical or unsteady flow structures. Such structures can be responsible for aerodynamic losses, flow blockages, disruption of the coherence of the primary swirling flow and/or the generation of noise (especially in the presence of sharp edges). The presence of a fence structure 204 thus has the potential to improve noise reduction, and to improve flow near the trailing end of the pylon 202.

In alternate embodiments, the fence structure 204, 208 is coupled to or integrated with the moveable pylon section 206. For example, the fence structure 204, 208 could be coupled to the upper end of the moveable pylon section 206 such that it resembles a roof that moves with the movable pylon section 206. Alternatively, the fence structure 204, 208 could be located between the upper and lower ends of the moveable pylon section 206. Regardless of the position, shape, size, or number of fence structures 204, 208, in such alternate embodiments the fence structure 204, 208 moves in concert with the moveable pylon section 206.

One or more moveable pylon sections can be utilized during aircraft operation for purposes of noise control, drag management, and/or flight control. In certain implementations, therefore, at least one moveable pylon section is used with one or more port side engines, and at least one moveable pylon section is used with one or more starboard side engines. For simplicity, the following description assumes that one moveable pylon section is located on one port engine, and that one moveable pylon section is located on one starboard engine. Moreover, the following description assumes that the moveable pylon sections can pivot in both directions, i.e., in the inboard and outboard directions relative to the fuselage of the host aircraft.

Figure 13:
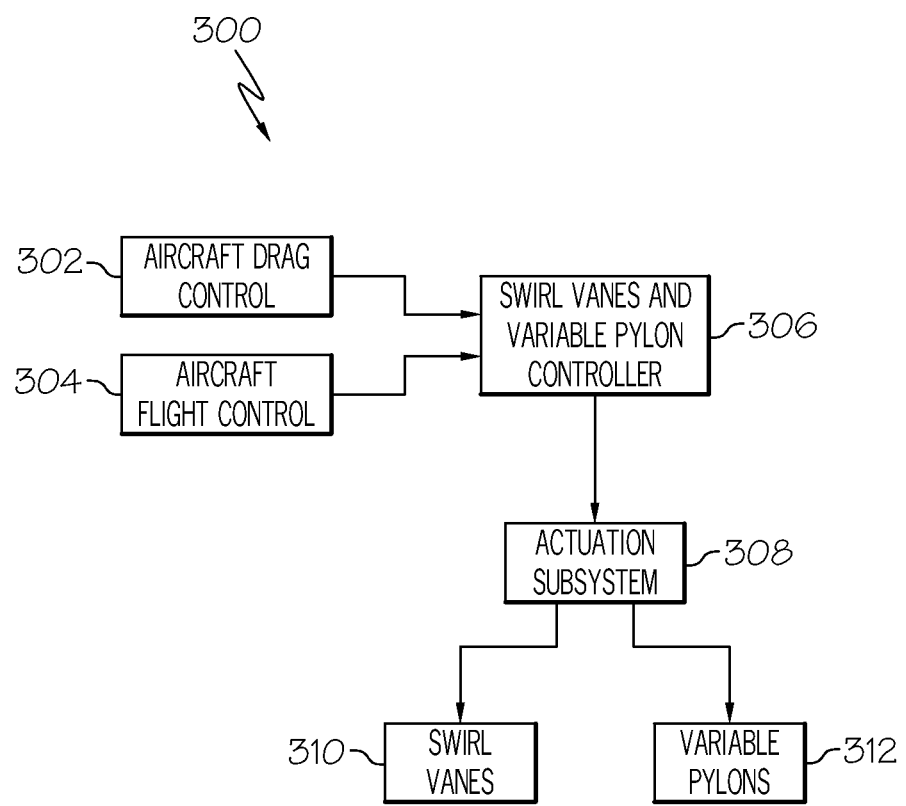
FIG. 13 is a schematic representation of an exemplary embodiment of an aircraft control system.

FIG. 13 is a block diagram representation of an exemplary embodiment of an aircraft control system 300. The system 300 may be realized as an onboard system of the host aircraft. Alternatively, some of the system 300 (e.g., user interface features, processing components, or the like) could be implemented at a remote location such as an air traffic control station, an electronic flight bag, a portable computer, or the like. In practice, the system 300 can be deployed with one or more processor devices, components, subsystems, or elements, as is well understood. For example, the system 300 may be implemented using an onboard computer system, a line replaceable unit, a portable computing or memory storage device, etc. Furthermore, although the system 300 could be deployed in conjunction with other aircraft subsystems, processing logic, software, or the like, FIG. 13 is a simplified depiction that focuses on the subject matter presented here.

The exemplary embodiment of the system 300 generally includes, without limitation: an aircraft drag control module 302; an aircraft flight control module 304; a controller 306 for the swirl vanes and variable geometry pylons; an actuation subsystem 308; controllable swirl vanes 310; and controllable variable pylons 312. These elements and modules (and other elements, modules, components, and subsystems if needed or desired) are coupled together in an appropriate manner to accommodate the transfer of data, the provision of operating power, and the like, as is well understood.

The aircraft drag control module 302 represents hardware, software, firmware, and/or processing logic that enables a user (typically a member of the flight crew) to control the drag management function of the system 300. As described previously, the swirl vanes 310 and the variable pylons 312 can be cooperatively deployed to achieve a desired increase in drag, relative to the amount of drag experienced in a non-deployed (conventional) aircraft operation. In practice, the aircraft drag control module 302 could be manipulated to generate drag management commands to control the deployment of the swirl vanes 310 independently or in concert with the variable pylons 312. Moreover, the aircraft drag control module 302 could be manipulated to control the port and starboard variable pylons 312 independently or in concert. An example drag-management scenario would be on approach to landing, where the trajectory of the aircraft may be controlled in terms of speed, descent angle, or a combination of the two to realize a benefit such as a reduction of noise as perceived by an observer on the ground.

The aircraft flight control module 304 represents hardware, software, firmware, and/or processing logic that enables a user (typically a member of the flight crew) to navigate and maneuver the host aircraft during taxi and flight operations. The swirl vanes 310 are typically stowed (non-deployed) for most of the flight, especially while cruising. However, the variable pylons 312 could be actuated as needed into deflected states to assist with various flight maneuvers such as, without limitation, roll, yaw, and pitch maneuvers. In practice, the aircraft flight control module 304 could be manipulated to control the movement of the port and starboard variable pylons 312 independently or in concert.

The controller 306 represents hardware, software, firmware, and/or processing logic that cooperates with the aircraft drag control module 302 and the aircraft flight control module 304 for purposes of processing user inputs. In certain embodiments, the controller 306 may be implemented as part of the aircraft drag control module 302 and/or as part of the aircraft flight control module 304. In operation, the controller 306 receives drag control and/or flight control commands from the respective modules 302, 304, processes the control commands as needed, and generates actuation commands intended to deploy, activate, or adjust the states of the swirl vanes 310 and/or the states of the variable pylons 312. In this regard, the controller 306 may provide the actuation commands, signals, or data to the actuation subsystem 308.

The actuation subsystem 308 represents hardware, software, firmware, and/or processing logic that is responsible for actuating the swirl vanes 310 and/or the variable pylons 312 in accordance with the user input, the control commands, and the actuation commands. In practice, the actuation subsystem 308 may include electromechanical actuators (e.g., solenoids), mechanical linkages, gears, pushrods, pneumatic lines, valves, and/or other devices, components, and elements that facilitate physical motion of the swirl vanes 310 and/or variable pylons 312. Although not always required, certain embodiments employ an actuation subsystem 308 that links the deployment of the swirl vanes 310 to the deployment of the variable pylons 312. In other words, the actuation subsystem 308 may be suitably configured such that the variable pylons return to their non-deployed positions when the swirl vanes 310 are stowed, and such that the variable pylons are only deployed when the swirl vanes 310 are deployed. Alternatively, the actuation subsystem 308 may employ one actuation mechanism for the swirl vanes 310 and an independent and uncorrelated actuation mechanism for the variable pylons 312. In yet other implementations, the host aircraft may have a selectable mode feature that allows the actuation of the swirl vanes 310 and the variable pylons 312 to be selectively coupled/decoupled as desired.

Figure 14:
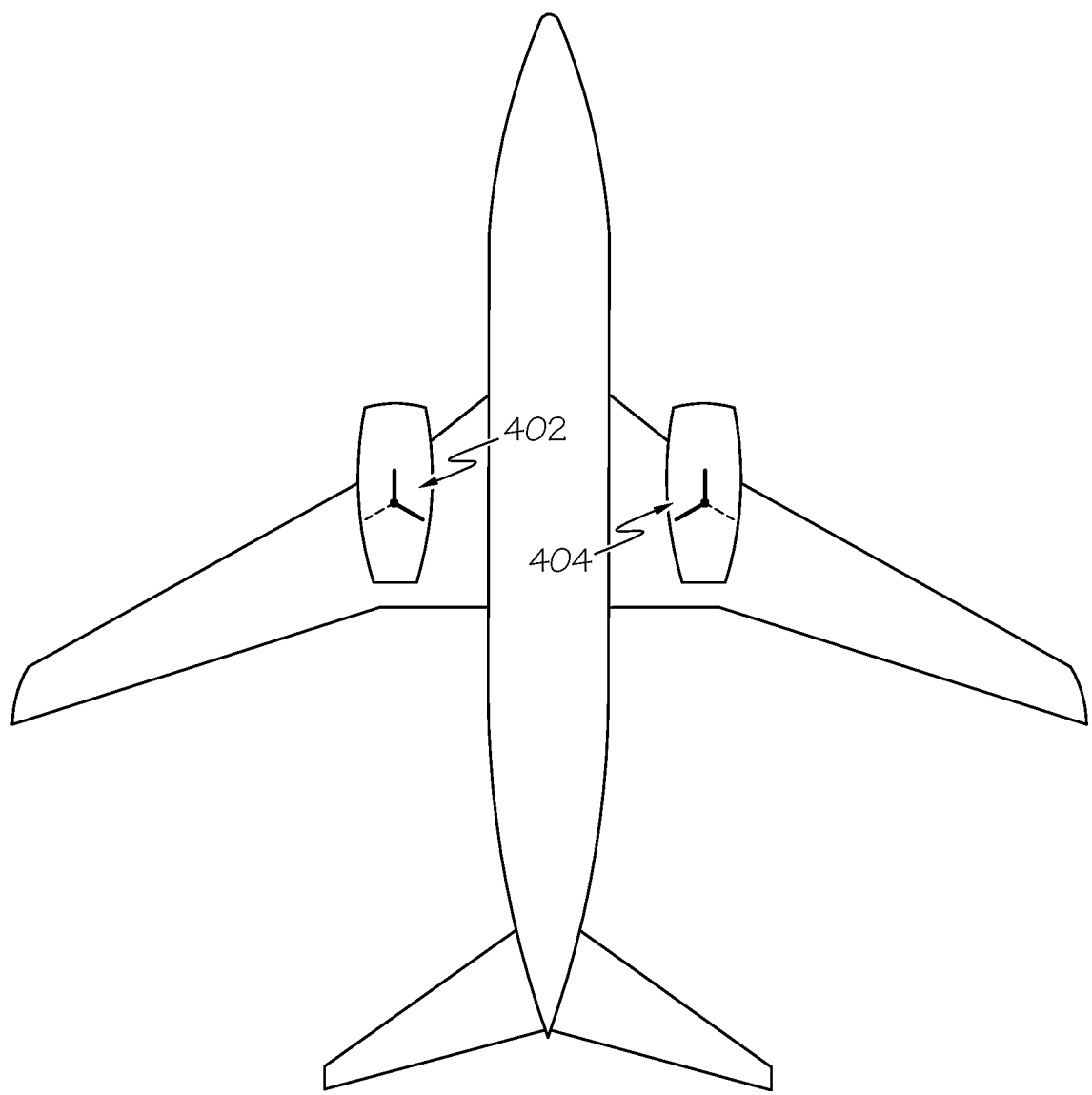
FIGS. 14-16 are diagrams that illustrate different pylon geometries that can be achieved by the aircraft control system shown in FIG. 13.
Figure 15:
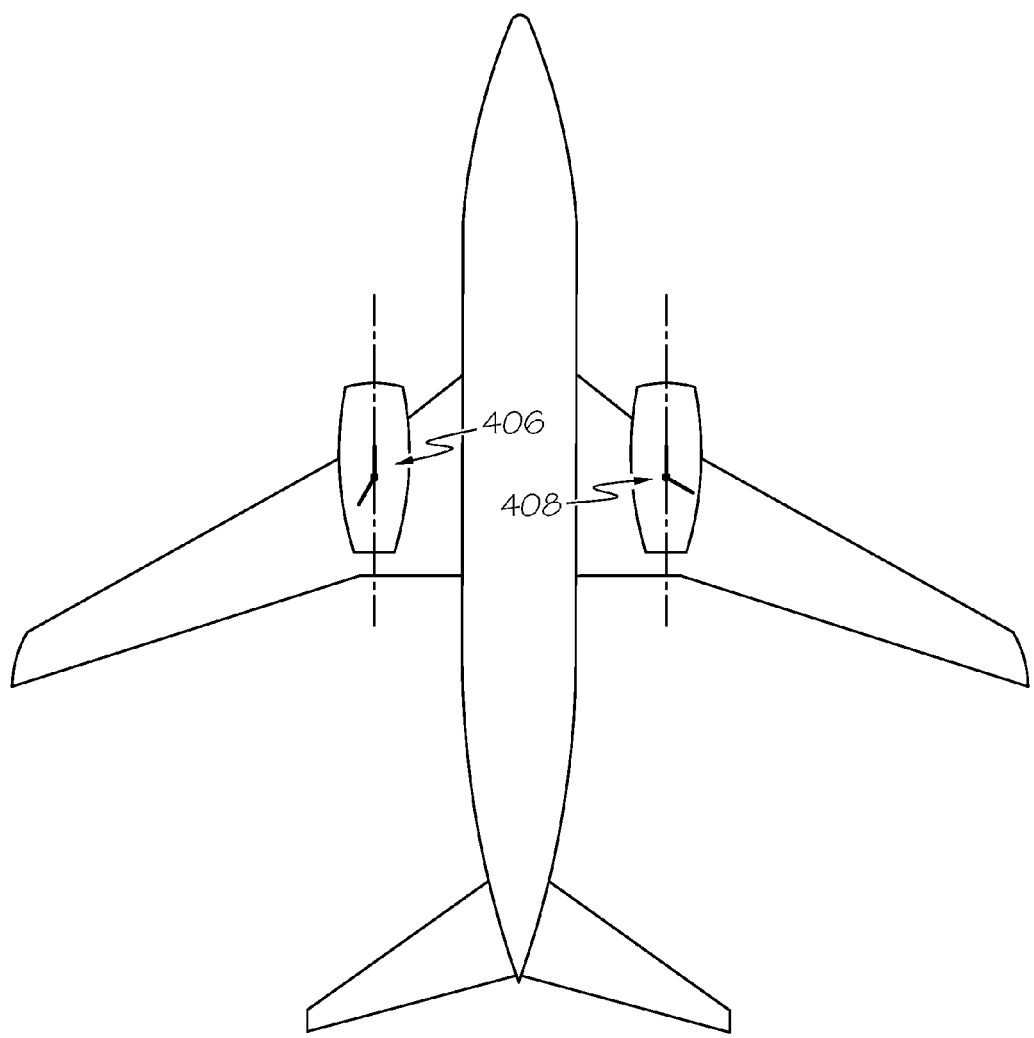
Figure 16:
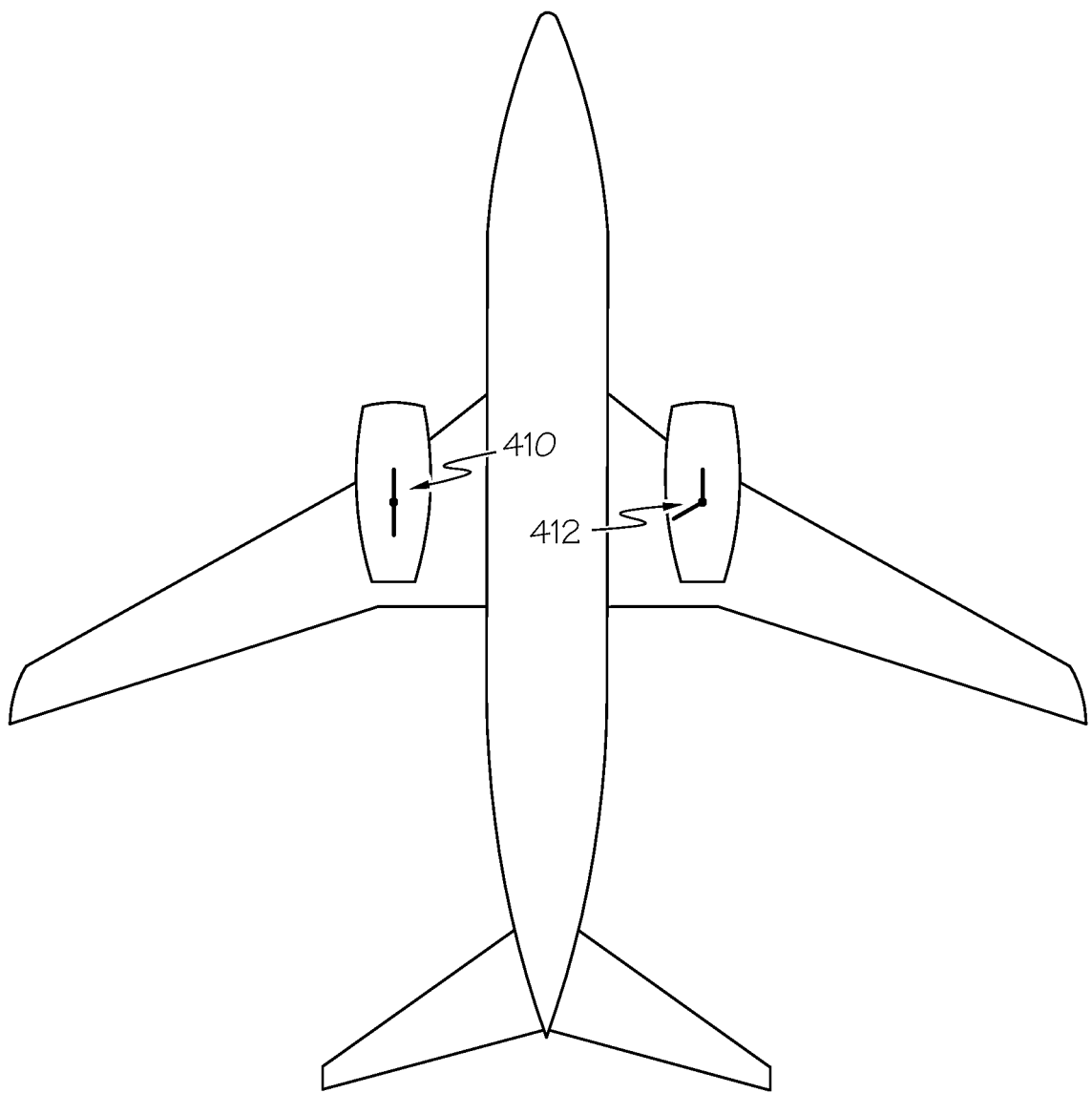

As mentioned above, a member of the flight crew can interact with the aircraft control system 300 during various phases of the flight. In this regard, FIGS. 14-16 are diagrams that illustrate different pylon geometries that can be achieved by the aircraft control system 300. For simplicity, FIGS. 14-16 assume that the aircraft has one wing-mounted port side engine and one wing-mounted starboard side engine, each having the features and functionality described above. It should be appreciated that these figures are merely exemplary, and that they are not intended to be exhaustive or limiting in any way, including the method of engine installation. In this regard, although FIGS. 14-16 depict wing-mounted engines, the concepts and technology presented here can also be applied in an equivalent manner to fuselage-mounted engines.

FIG. 14 corresponds to a typical drag management scenario. For increased drag during approach, the swirl vanes (not shown in FIGS. 14-16) are deployed to produce a swirling outflow from the bypass nozzles of the engines. In conjunction with swirl vane deployment, the variable pylons are actuated such that they are both facing inboard or outboard, and such that their deflected positions are aligned or substantially aligned with the swirling fluid streams produced by the engines. FIG. 14 depicts the state where the port side variable pylon 402 and the starboard side variable pylon 404 are both facing inboard or inward. This arrangement assumes that the swirl vanes for the port engine produce a clockwise swirl (when viewed aft looking forward; see FIG. 7), and that the swirl vanes for the starboard engine produce a counterclockwise swirl. The dashed lines in FIG. 14 indicate an equivalent state where the pylons 402, 404 are both facing outboard or outward. This opposite arrangement assumes that the swirl vanes for the port engine produce a counterclockwise swirl, and that the swirl vanes for the starboard engine produce a counterclockwise swirl.

FIG. 15 depicts an exemplary scenario where the variable pylons 406, 408 are controlled to assist in flight maneuvering. For this situation, it is assumed that the swirl vanes have been deployed, the port side variable pylon 406 is actuated into an outboard position at a first angle relative to the fore-aft longitudinal axis of the aircraft, and the starboard side variable pylon 408 is actuated into an outboard position at a second angle relative to the fore-aft longitudinal axis of the aircraft. The swirling exhaust of the two engines will be rotating in opposite directions, as described above for FIG. 14. Notably, the second angle is greater than the first angle, resulting in different levels of swirl associated with the two engines and, consequently, different amounts of drag. The different amounts of swirl caused by the deployment of the variable pylons 406, 408 results in a net roll moment, and the different amounts of drag results in a net yaw moment. In practice, an appropriate combination of yaw and roll can be used to achieve a coordinated flight turn (similar to how the ailerons and rudder operate in concert). Accordingly, the variable pylons 406, 408 could be deployed in a controlled manner to achieve or assist in certain aircraft flight maneuvers.

The use of variable pylons in a flight control scenario has several practical implications. For example, the use of variable pylons as a flight control mechanism provides an opportunity to resize the traditional aircraft control surfaces if so desired. As another example, variable pylons could be utilized to extend the range of maneuverable capability beyond the ordinary structural limits placed on conventional flight control surfaces. Moreover, variable pylons can provide auxiliary flight control for enhanced safety and failover operation. Furthermore, variable pylons could enable the aircraft to perform unconventional flight maneuvers that might be unrealistic or impractical using only conventional flight control surfaces.

FIG. 16 depicts an exemplary scenario where the port side variable pylon 410 remains in its nominal non-deployed state. The starboard side variable pylon 412, however, is actuated into an inboard position. FIG. 16 is presented here to illustrate that both variable pylons need not always be moved, and that there could be a situation where only one of the variable pylons is actuated.

Exemplary Control Procedures

The aircraft control system 300 can be utilized during operation of the host aircraft to manage the amount of drag (which may be useful during approach) and/or to assist in the maneuvering of the aircraft during flight. In this regard, an exemplary control methodology for drag management may be initiated by a member of the flight crew, by air traffic control, or the like. The drag management procedure may begin by obtaining or receiving a drag management command that is indicative of a desired amount of drag. The drag management command may be generated by an onboard flight management system, a user interface feature, or the like. This example assumes that the drag management command specifies an amount of drag that would best be achieved via deployment of swirl vanes and movable pylon sections. In practice, therefore, the drag management command may initiate deployment of the swirl vanes and initiate deflection of the movable pylon sections (for both the port and starboard engines).

The aircraft control system 300 processes the drag management command in an appropriate manner and generates one or more actuation signals or commands in response to the drag management command. The characteristics of the actuation signals (e.g., electronic, magnetic, pneumatic, or other characteristics) will be influenced by the drag management command. The actuation signals are formatted or are otherwise compliant with the respective electromechanical, magnetic, pneumatic, optical, and/or other control and actuation requirements of the swirl vanes and the moveable pylon sections. In this regard, the swirl vanes and the moveable pylon sections are deployed, activated, and actuated in response to their respective actuation signals.

In certain embodiments, the swirl vanes are actuated from their stowed or inactive positions and into their deployed positions so that the swirl vanes can produce the swirling fluid streams as described above. In conjunction with the deployment of the swirl vanes, the moveable pylon sections are actuated into their deflected positions. Notably, the extent of deployment of the swirl vanes and/or the amount of deflection of the moveable pylon sections may be governed by the drag management command. In this way, the resulting amount of drag can be regulated as needed.

Similarly, an exemplary flight control methodology for maneuvering the aircraft may be initiated by a member of the flight crew, by air traffic control, or the like. The flight control procedure may begin by obtaining or receiving a flight maneuver command that is indicative of a desired flight maneuver (e.g., pitch, roll, yaw, acceleration, deceleration, climb, descend, etc.). The flight maneuver command may be generated by an onboard flight control system, a user interface feature, flight deck instrumentation, or the like. This example assumes that the flight maneuver command specifies a maneuver that is associated with the actuation of the moveable pylon sections. In most typical cruise scenarios, the swirl vanes will remain in their non-deployed and inactive states to minimize drag. In practice, therefore, the flight maneuver command can initiate deflection of one or both of the movable pylon sections.

The aircraft control system 300 processes the flight maneuver command in an appropriate manner and generates one or more actuation signals or commands in response to the flight maneuver command. As mentioned above for the drag management scenario, the characteristics of the actuation signals are influenced by the flight maneuver command, and the actuation signals are compliant with the respective electromechanical, magnetic, pneumatic, optical, and/or other control and actuation requirements of the moveable pylon sections. In this regard, one or both of the moveable pylon sections are actuated and deflected in response to their respective actuation signals. The direction and amount of deflection of each moveable pylon section is dictated by the particular flight maneuver command. As mentioned previously, deflection of a moveable pylon section alters the primary component of thrust for the respective engine, which in turn influences the flight characteristics of the aircraft. Thus, a member of the flight crew can maneuver the aircraft during flight using the moveable pylon sections.

Examples And Related Test Results

An example of the utility of the variable geometry aircraft pylon structure and related operational techniques is provided here. Prototype hardware was designed using state-of-the-art methods and computational simulation tools. The designs were shown to be capable of generating the preferred swirling nozzle exhaust flow using a combination of swirl vanes near the bypass nozzle exit and a variable geometry aircraft pylon structure of the type described herein. Using computational fluid dynamics simulation software to visualize the flow field streamlines, the test article was shown to be capable of generating a coherent swirling outflow from the bypass nozzle in the deployed configuration (see, for example, the simulation depicted in FIG. 8).

The test structure was fabricated and tested at model-scale in a facility that measured the flow, thrust, and noise. The experimental results demonstrate that for a commercial aircraft at a typical approach speed of Mach 0.21, a drag coefficient above 0.5 based on freestream dynamic pressure and fan circular cross-sectional area can be realized with less than ten decibels jet noise penalty associated with the swirling flow. Computational noise models suggest this noise penalty is benign because in many cases the noise made by the airframe of an approaching aircraft masks the nominal jet noise by as much as twenty decibels.

Figure 17:
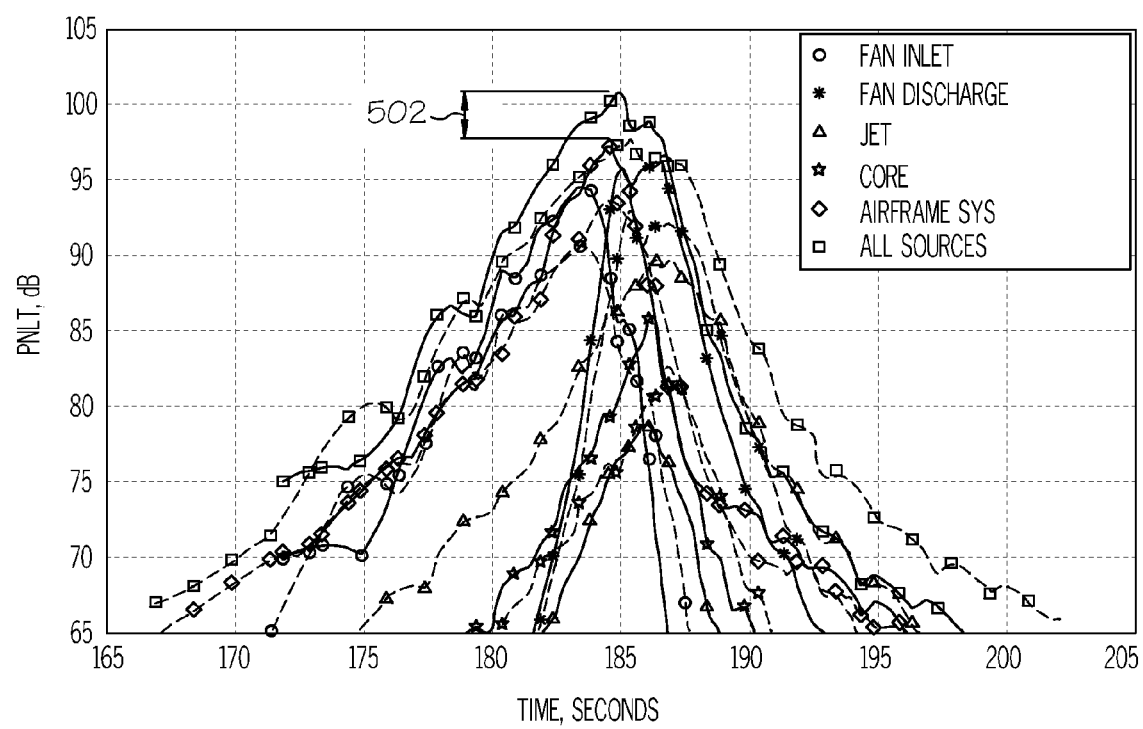
FIG. 17 is a graph that depicts predicted noise levels for an aircraft outfitted with swirl vanes and a variable geometry pylon structure.

The measured drag of the test article has been scaled up to the level of a typical single-aisle passenger aircraft on approach in the size class of a BOEING 737-800, powered by two wing-mounted turbofan engines in order to analytically model a steep approach noise reduction scenario through the deployment of the swirl vanes and the variable geometry aircraft pylon structure. FIG. 17 is a graph that compares computationally predicted time histories of tone-corrected perceived noise (PNLT, which is a noise metric used in the certification process) of a conventional aircraft of this size on approach (solid lines) and the same aircraft with the deployed drag management device (dashed lines). The time histories of noise from all sources combined and individual components are indicated by various symbols shown in the legend. Notably, the peak PNLT reduction (as indicated by the range 502 depicted in FIG. 17) is about 3.1 dB.

The conventional aircraft approach to landing is 3.2 degrees while the additional drag from the deployed drag management device enables a 4.4 degree approach at a similar aircraft speed. Thus, the steep approach places the aircraft farther from the ground observation point where noise is measured, resulting a reduction of 3.1 decibels of the peak value of PNLT (see FIG. 17). The observed noise due to the jet component associated with the deployed device approach is shown to increase relative to the conventional device. By contrast, the total noise due to all sources is shown to decrease at the noise observer's location, by the primary mechanism of enabling the aircraft to fly farther from the observer. The effective perceived noise level (EPNL, a time-integrated overall noise metric used in the certification process) is thus found to be reduced by 1.8 decibels. It is to be noted that the steep-approach scenario is presented as a convenient example but is not associated with any aircraft certification requirement associated with regulatory bodies.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An aircraft control structure comprising:
a nozzle assembly configured to exhaust a swirling fluid stream; and
a pylon configured to be coupled between the nozzle assembly and an aircraft support structure, the pylon comprising a moveable pylon section positioned proximate an exit end of the nozzle assembly such that when deployed into a deflected state the moveable pylon section maintains the swirling fluid stream.

2. The aircraft control structure of claim 1, wherein the nozzle assembly comprises:
a nozzle; and
a plurality of swirl vanes positioned in the nozzle to produce the swirling fluid stream.

3. The aircraft control structure of claim 2, wherein the plurality of swirl vanes and the moveable pylon section are deployed to assist in drag management.

4. The aircraft control structure of claim 2, wherein the plurality of swirl vanes and the moveable pylon section are actuated in concert.

5. The aircraft control structure of claim 2, wherein the nozzle is a bypass nozzle of a turbofan engine.

6. The aircraft control structure of claim 2, wherein the nozzle is a core nozzle of a turbofan engine.

7. The aircraft control structure of claim 1, wherein the moveable pylon section is moveably coupled at a trailing end of the pylon.

8. The aircraft control structure of claim 1, further comprising a fence structure positioned overlying the moveable pylon section and configured to cover an opening between the pylon and the moveable pylon section when the moveable pylon section is deployed.

9. An aircraft subsystem comprising:
a first engine configured to exhaust a first high pressure fluid stream;
a first variable geometry deployable pylon configured to be coupled between the first engine and an aircraft, the first variable geometry deployable pylon comprising a first moveable pylon section positioned proximate an exit end of the first engine to influence a primary component of thrust of the first high pressure fluid stream; and
a control system to actuate the first moveable pylon section into a deflected state to redirect the first high pressure fluid stream and alter its primary component of thrust in accordance with a flight maneuver command for the aircraft.

10. The aircraft subsystem of claim 9, further comprising:
a second engine configured to exhaust a second high pressure fluid stream; and
a second variable geometry deployable pylon configured to be coupled between the second engine and the aircraft, the second variable geometry deployable pylon comprising a second moveable pylon section positioned proximate an exit end of the second engine to influence a primary component of thrust of the second high pressure fluid stream;
wherein the control system actuates the second moveable pylon section into a deflected state to redirect the second high pressure fluid stream and alter its primary component of thrust in accordance with the flight maneuver command.

11. The aircraft subsystem of claim 10, wherein:
the first engine, the first variable geometry deployable pylon, and the first moveable pylon section are associated with a port side engine of the aircraft; and
the second engine, the second variable geometry deployable pylon, and the second moveable pylon section are associated with a starboard side engine of the aircraft.

12. The aircraft subsystem of claim 10, wherein the control system actuates the first moveable pylon section and the second moveable pylon section in concert with one another.

13. The aircraft subsystem of claim 10, wherein the control system actuates the first moveable pylon section and the second moveable pylon section independently.

14. The aircraft subsystem of claim 9, further comprising a fence structure positioned overlying the first moveable pylon section and configured to cover an opening between the first variable geometry pylon and the first moveable pylon section when the first moveable pylon section is deployed.

15. An aircraft subsystem comprising:
a first nozzle and a first swirl vane assembly configured to exhaust a first swirling fluid stream;
a first variable geometry deployable pylon configured to be coupled between the first nozzle and an aircraft, the first variable geometry deployable pylon comprising a first moveable pylon section positioned proximate an exit end of the first nozzle such that when deployed into a deflected state the first moveable pylon section influences the first swirling fluid stream;
a second nozzle and a second swirl vane assembly configured to exhaust a second swirling fluid stream;
a second variable geometry deployable pylon configured to be coupled between the second nozzle and the aircraft, the second variable geometry deployable pylon comprising a second moveable pylon section positioned proximate an exit end of the second nozzle such that when deployed into a deflected state the second moveable pylon section influences the second swirling fluid stream; and
a control system to regulate deployment of the first swirl vane assembly, deployment of the second swirl vane assembly, and deflected positions of the first moveable pylon section and the second moveable pylon section in accordance with a drag management command for the aircraft.

16. The aircraft subsystem of claim 15, wherein:
the first nozzle, the first swirl vane assembly, the first variable geometry deployable pylon, and the first moveable pylon section are associated with a port side engine of the aircraft; and
the second nozzle, the second swirl vane assembly, the second variable geometry deployable pylon, and the second moveable pylon section are associated with a starboard side engine of the aircraft.

17. The aircraft subsystem of claim 15, wherein the control system deploys the first swirl vane assembly, the first moveable pylon section, the second swirl vane assembly, and the second moveable pylon section in concert with one another.

18. The aircraft subsystem of claim 15, wherein the control system moves the first moveable pylon section and the second moveable pylon section into deflected positions aligned with the first swirling fluid stream and the second swirling fluid stream, respectively, to maintain swirling of the first swirling fluid stream and the second swirling fluid stream.

19. The aircraft subsystem of claim 15, wherein the control system moves the first moveable pylon section and the second moveable pylon section into deflected positions misaligned with the first swirling fluid stream and the second swirling fluid stream, respectively, to reduce swirling of the first swirling fluid stream and the second swirling fluid stream.

* * * * *